(12) United States Patent
Berels et al.

(10) Patent No.: US 10,093,187 B2
(45) Date of Patent: Oct. 9, 2018

(54) REDUNDANT POWER SUPPLY

(71) Applicant: Ford Global Technologies, LLC, Dearborn, MI (US)

(72) Inventors: David Jeffeory Berels, Plymouth, MI (US); Douglas B. Thornburg, Dearborn, MI (US); Brock Watters, Livonia, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 264 days.

(21) Appl. No.: 15/224,722

(22) Filed: Aug. 1, 2016

(65) Prior Publication Data

US 2018/0029474 A1  Feb. 1, 2018

(51) Int. Cl.
| | | |
|---|---|---|
| B60L 1/00 | (2006.01) | |
| B60L 3/00 | (2006.01) | |
| H02G 3/00 | (2006.01) | |
| B60L 11/18 | (2006.01) | |
| B60R 16/04 | (2006.01) | |

(52) U.S. Cl.
CPC ......... B60L 3/0092 (2013.01); B60L 11/1851 (2013.01); B60R 16/04 (2013.01); *B60L 2210/10* (2013.01)

(58) Field of Classification Search
USPC ............................................... 307/10.1, 10.6
See application file for complete search history.

(56) References Cited

U.S. PATENT DOCUMENTS

| | | | | |
|---|---|---|---|---|
| 6,909,201 B2* | 6/2005 | Murty | ................... | H02J 7/1423 307/10.1 |
| 9,370,992 B2* | 6/2016 | Holmes | ................... | B60K 6/485 |
| 9,731,610 B2* | 8/2017 | Reichow | ............ | B60L 11/1811 |
| 2015/0274027 A1 | 10/2015 | Crombez et al. | | |
| 2016/0137092 A1* | 5/2016 | Thieme | ............... | B60L 11/1861 307/10.6 |
| 2018/0029474 A1* | 2/2018 | Berels | .................... | B60L 3/0092 |
| 2018/0037121 A1* | 2/2018 | Narla | .................. | B60L 11/1811 |
| 2018/0050603 A1* | 2/2018 | Hand, III | ............ | B60L 11/1812 |
| 2018/0056808 A1* | 3/2018 | Gibson | ............... | B60L 11/1866 |
| 2018/0111500 A1* | 4/2018 | Ogaki | ................. | H01M 10/613 |

FOREIGN PATENT DOCUMENTS

| | | |
|---|---|---|
| CN | 1983709 A | 12/2005 |
| EP | 0660487 A2 | 6/1995 |
| EP | 2394861 A2 | 12/2011 |
| GB | 2403610 A | 1/2005 |
| JP | 2007118656 A1 | 5/2007 |
| JP | 2012131247 A | 7/2012 |
| KR | 1020120107715 | 10/2012 |

OTHER PUBLICATIONS

UK Search Report re GB Application No. 1712254.0 dated Jan. 28, 2018.

* cited by examiner

*Primary Examiner* — Adam Houston

(74) *Attorney, Agent, or Firm* — Frank A. MacKenzie; Bejin Bieneman PLC

(57) ABSTRACT

A vehicle system includes multiple DC-DC converter circuits, vehicle batteries, and vehicle power distribution buses. Each vehicle battery is electrically connected in parallel to each of the DC-DC converter circuits. Each of the vehicle batteries is also electrically connected in parallel to one another. Further, each of the DC-DC converter circuits and each of the vehicle batteries are electrically connected to multiple vehicle power distribution buses.

20 Claims, 4 Drawing Sheets

REDUNDANT POWER SUPPLY

BACKGROUND

Certain vehicle components rely on electrical power to operate properly. Examples of such components include electric motors, sensors, actuators, and electronic control units. The electrical power for these and other components often comes from the vehicle battery, a vehicle power generator, or the like.

DETAILED DESCRIPTION

A vehicle power supply needs to be resilient against safety critical faults in order to ensure proper operation of the vehicle. Autonomous vehicles, including partially autonomous vehicles, have significantly higher electrical loads than non-autonomous vehicles since autonomous and partially autonomous vehicles rely on more sensors and computing devices than their non-autonomous counterparts. Autonomous vehicles rely on power supplies to power those additional sensors and computing devices. The power supply architecture may be designed to tolerate certain failures, meaning that, even with a partial failure, the power supply allows the vehicle to fulfil certain safety critical functionalities such as operating the vehicle in a limp home mode.

An example of a fault tolerant architecture includes multiple DC-DC converter circuits and multiple batteries wired in parallel. That is, the outputs of DC-DC converter circuits are connected to one another and connected to the positive poles of the vehicle batteries. The architecture further includes multiple power distribution buses, each connected to the parallel connected DC-DC converter circuits and to the vehicle batteries. During faulty conditions, such as when a DC-DC converter circuit or a vehicle battery fails, other redundant elements, i.e., other operational batteries or DC-DC converter circuits, may be available to provide at least a part of electrical power needed to operate the vehicle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
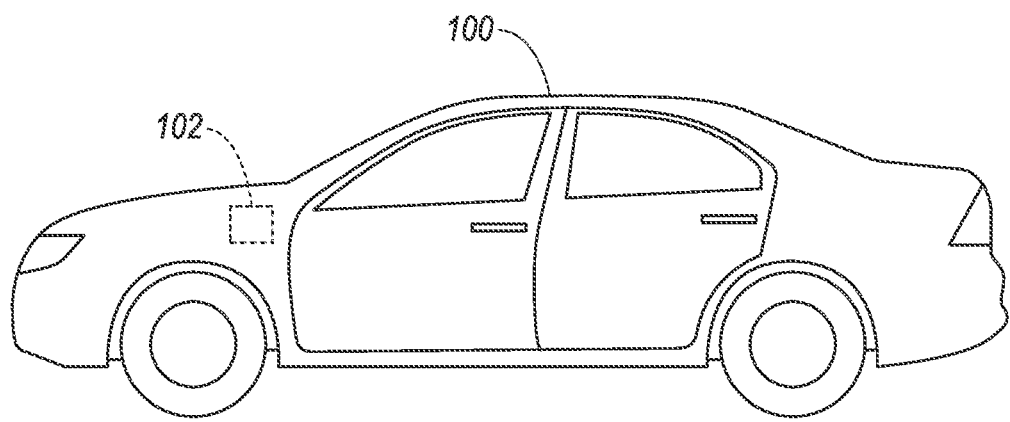
FIG. 1 illustrates an example vehicle including a vehicle system

FIG. 1 illustrates a vehicle 100 with a vehicle system 102. The vehicle system 102 allows the vehicle 100 to operate, e.g., accelerate, decelerate, steer, and brake. The vehicle system 102 may include power supply components and electrical vehicle loads. The power supply components, as discussed in greater detail below, provide power to at least some of the vehicle electrical loads. The power supply components may refer to components such as vehicle power generators, DC-DC converter circuits, and batteries to provide and store electrical energy. The vehicle loads may refer to components, such as actuators, sensors, electronic circuits, and lights, that consume power provided by the power supply components. The power supply components may be arranged redundantly to, e.g., provide backup power when one or more of the other power supply components partially or fully fails. By providing backup power, certain vehicle operations may be possible despite a failed power supply component.

Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle that operates in an autonomous (e.g., driverless) mode, a partially autonomous mode, and/or a non-autonomous mode.

Figure 2:
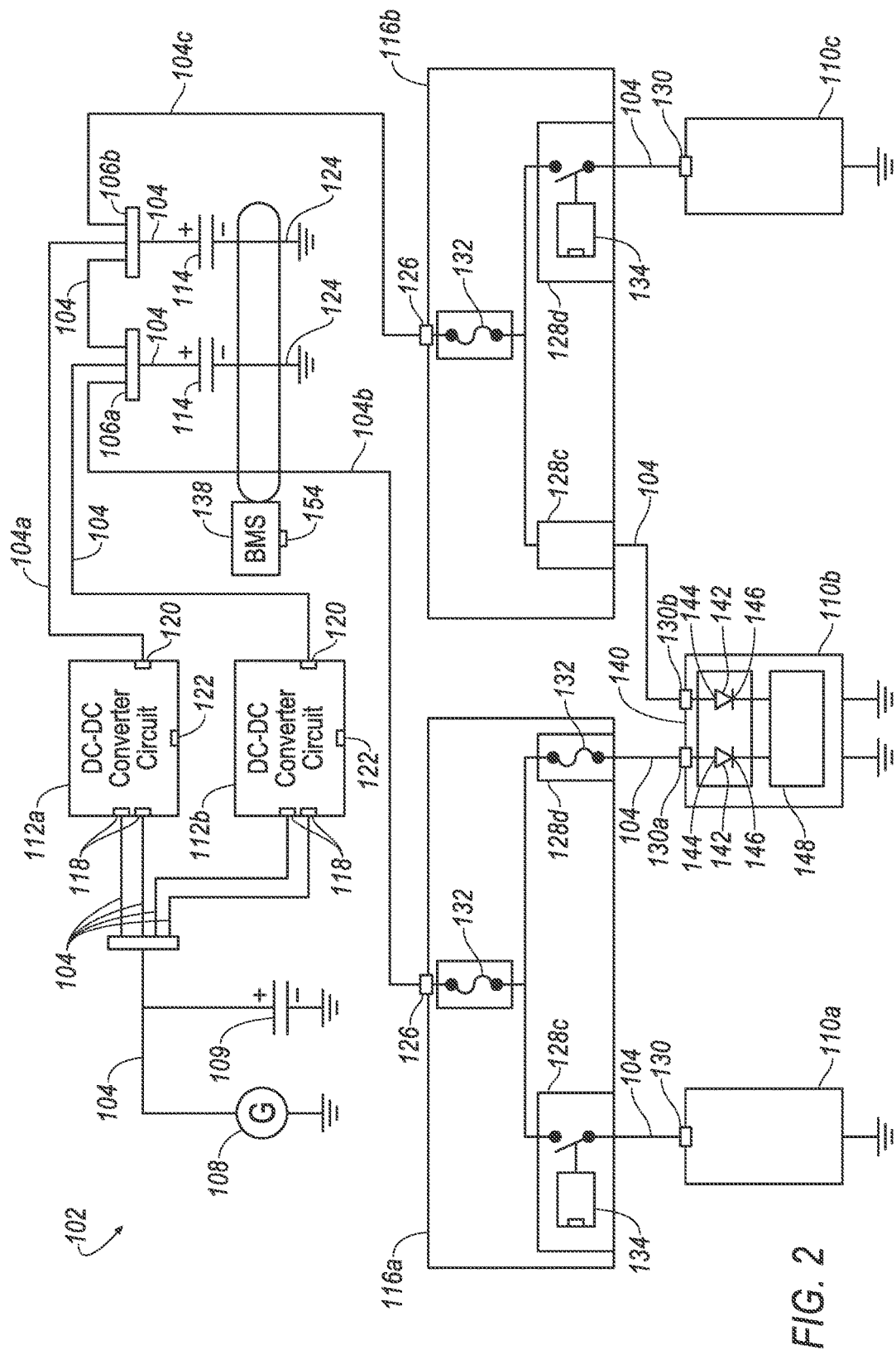
FIG. 2 illustrates an electrical schematic of the vehicle system incorporated in the vehicle.

FIG. 2 illustrates one implementation of the vehicle system 102 having power lines 104, power junction elements 106, power generators 108, vehicle loads 110, DC-DC converter circuits 112, vehicle batteries 114, and vehicle power distribution buses 116. As shown, each vehicle battery 114 is electrically connected in parallel to each of the DC-DC converter circuits 112. Each of the vehicle batteries 114 is also electrically connected in parallel to one another. Further, each of the DC-DC converter circuits 112 and each of the vehicle batteries 114 are electrically connected to multiple vehicle power distribution buses 116. The DC-DC converter circuits 112, the vehicle batteries 114, and the vehicle power distribution buses 116 may be located throughout the vehicle 100 such as in an engine compartment or trunk of the vehicle 100.

The vehicle system 102 components such as the vehicle power generator 108, the DC-DC converter circuits 112, the vehicle batteries 114, and the vehicle power distribution buses 116 are electrically connected via power lines 104 and power junction elements 106. A power line 104 refers to an electrical connection in the vehicle 100 for transferring electrical power. A power line 104 may include a conductive material such copper or aluminum and may be implemented as a wire, plate, etc. Power lines 104 are typically covered with an insulator to electrically insulate the power line 104 from other electrically conductive parts of the vehicle 100. In some instances, the power lines 104 may be bundled in a vehicle wiring harness. The power junction elements 106 may refer to conductive connections between or among multiple power lines 104. For example, a power junction element 106 can include a copper plate connected to power lines 104. In one possible approach, the power lines 104 may be soldered to the copper plate. The power junction element 106 may further include a housing covering the conductive section of the copper plate. Alternatively, the power junction element 106 may refer to a conductive cable connector that can attach to a corresponding connector via, e.g., screws, as a part of a wiring harness.

The power generator 108, e.g. an alternator, converts mechanical energy to electrical energy. For example, the power generator 108 may convert mechanical energy from a rotating shaft into electrical energy. The electrical energy generated may be in the form of direct current (DC) energy or alternating current (AC) energy. Thus, in one possible approach, the power generators 108 in the vehicle system 102 may be implemented as DC power generators 108. If an AC power generator 108 is used, a rectifier circuit can be used to convert the alternating current generated into a direct current. Alternatively, vehicles with AC vehicle loads 110, e.g., electrical motors to drive an electric car, may have inverter circuits to convert DC energy into an alternating current. Additionally, the vehicle power generator 108 may be external to the vehicle 100. An example of an external power generator 108 may include an electrical charging station battery 109 connected to the vehicle system 102 of a hybrid or electrical vehicle 100. In one example, the power generator 108 can be mechanically driven by an engine of the vehicle, e.g., a hybrid vehicle, and can generate a high AC voltage such as 300 VAC. The power generator 108 may include an inverter circuit which can convert the generated high voltage AC to a high DC voltage such as 300 VDC. The high voltage DC may then be fed to the DC-DC converter circuits 112.

The vehicle loads 110 may include electronic devices that draw power from the vehicle batteries 114, the power generator 108, etc. Examples of vehicle loads 110 may include electrical actuators, such as electrical motors, and electronic components, such as chips and sensors. The vehicle loads 110 may be categorized according to how the vehicle load 110 contributes to the operation of the vehicle 100. For example, vehicle loads 110 may be categorized as either a standard vehicle load 110 or a critical vehicle load 110. The standard vehicle load 110 category may apply to vehicle loads 110 that are less critical to overall vehicle operation. For example, an air conditioner may be considered as a standard vehicle load 110 because air conditioning, while important to occupant comfort, is not required to properly operate the vehicle 100. The critical load category may apply to vehicle loads 110 that carry out certain vehicle actions required to properly operate the vehicle 100. The critical vehicle load 110 category, therefore, may be applied to the brake controller. Power may be redistributed according to the categories of the loads if one of the DC-DC converter circuits 112 fails. For example, if available electrical energy (e.g., total nominal power pertaining to nominal power of all DC-DC converter circuits 112 minus the nominal power of the failed DC-DC converter circuit 112) is not sufficient to operate all vehicle loads 110, at least some standard vehicle loads 110 may be shut off so that certain critical vehicle loads 110 may remain operational.

The DC-DC converter circuits 112 are one type of electric power converter that can convert direct current (DC) energy from one voltage level to another. For example, a DC-DC converter circuit 112 in a hybrid vehicle (i.e., a vehicle with both an internal combustion engine and a battery 114 for driving powertrain components) may convert a high DC voltage output by the vehicle power generator 108 to a low voltage DC for use by electronic components in the vehicle 100. The DC-DC converter may have an input terminal 118 connected to an input power line 104 and an output terminal 120 connected to an output power line 104. In some possible approaches, the DC-DC converter circuit 112 may have more than one input terminal 118, output terminal 120, or both. For instance, if the power supply to one input terminal 118 fails because of loose contact to the power line 104, a second input terminal 118 may maintain the supply of power to the DC-DC converter circuit 112. Similarly, if a first output terminal 120 fails, a second output terminal 120 may maintain the supply of power from the DC-DC converter circuit 112 to a second power line 104. The DC-DC converter circuits 112 may each further include a converter circuit having power electronic components such as insulated-gate bipolar transistors (IGBT) and a control circuit. The control circuit may monitor operation of the converter circuit and detect a malfunction in the DC-DC converter circuit 112. For instance, the control circuit may be programmed to detect a damaged power electronic component, disconnected or loose wiring to a DC-DC converter terminal, etc. Further, the DC-DC converter circuit 112 may include a processor programmed to diagnose malfunctions in the DC-DC converter circuit 112, the control circuit, or both. The control circuits of the DC-DC converter circuit 112 may communicate with another circuit through a communication interface 122 that may allow that an external circuit, such a processor, to receive signals, such as a malfunction code, indicating internal information about the DC-DC converter circuit 112.

The vehicle batteries 114 are implemented as energy storage devices, such as absorbed glass mat (AGM) batteries 114. Each of the vehicle batteries 114 may operate at different voltage and power levels. For example, batteries 114 supplying power to electronic components of the vehicle 100 may have a nominal voltage of 12V DC, whereas high voltage batteries 114 connected to vehicle power generator 108 of a hybrid vehicle may output electrical energy on the order of several hundred volts. Such high voltage batteries 114 may be made by electrically connecting several low voltage batteries 114 in series. Each of the batteries 114 may have a ground pole connected through a ground line 124 to a metal body of the vehicle 100, and a positive pole connected through a power line to, e.g., a power junction element 106.

The vehicle power distribution buses 116 each distribute electrical power from a power source to multiple vehicle loads 110. The vehicle system 102 may include multiple vehicle power distribution buses 116. For example, a main vehicle power distribution bus 116 and an auxiliary vehicle power distribution bus 116 are shown in FIG. 2. In one example, the main vehicle power distribution bus 116 may provide electrical energy to all vehicle loads 110 and the auxiliary power distribution bus may serve as a redundant energy source for only critical vehicle loads 110 (e.g., vehicle loads 110 falling under the critical load category). In other words, the auxiliary power distribution bus and the main vehicle power distribution bus 116a may both supply electrical energy to the critical vehicle loads 110.

Each vehicle power distribution bus 116 includes one or more input terminals 126 connected through a power line 104 to a source of electrical energy such as a power junction element 106 connected to the vehicle batteries 114, the DC-DC converter circuits 112, or both. Each vehicle power distribution bus 116 may further include multiple output terminals 128 to output electrical energy to one or more of the vehicle loads 110. Each output terminal 128 may be connected to a power supply input terminal 130 of one or more vehicle loads 110. The output terminals 128 may be individually interruptible. That is, an individually interruptible output terminal 128 of the main vehicle power distribution bus 116 can be individually turned on or off independent of other output terminals 128 of the main vehicle power distribution bus 116. Individually interruptible output terminals 128 may include an overload protection circuit 132, such as a fuse, that shuts off when a current flowing through the output terminal 128 exceeds a predetermined threshold. Some individually interruptible output terminals 128 may include a controllable switch 134, such as a relay, that can be controlled (e.g., turned on, off, or dimmed) through an external circuit such as a processor of a battery management system 138. Thus, when a DC-DC converter circuit 112 fails, resulting in a drop in the available electrical energy in the vehicle system 102, the processor 136 may send a signal to the controllable switch 134 of an individually interruptible output terminal 128 connected to a standard vehicle load 110 to shut the switch off. Doing so may reduce an aggregated electrical energy consumption pertaining to all or a subset of operational vehicle loads 110.

Each of the vehicle power distribution buses 116 may include an overload protection circuit 132 that shuts off the vehicle power distribution bus 116 when a current consumption of the vehicle power distribution bus 116 exceeds a predetermined threshold. As one example, each vehicle power distribution bus 116 overload protection circuit 132 may monitor the collective current drawn by all vehicle loads 110 connected to the output terminals 128 of the respective vehicle power distribution bus 116, compare the current draw to the predetermined threshold, and shut off (e.g., disconnect) the output terminals 128 if the current draw exceeds the predetermined threshold. Alternatively or additionally, the vehicle system 102 may include overload protection circuits 132, such as fuses located on the power lines 104 connecting the vehicle batteries 114 or DC-DC converter circuits 112, that shut off one or more power distribution buses when the current consumption exceeds the predetermined threshold.

Some vehicle loads 110, such as critical vehicle loads 110, may have more than one power supply input terminals 130 to receive electrical energy from multiple vehicle power distribution buses 116, such as the main vehicle power distribution bus 116 and the auxiliary vehicle power distribution bus 116. For example, a vehicle load 110 may have a first power supply input terminal 130 connected to an output terminal 128 of the main power distribution bus and a second power supply input terminal 130 connected to an output terminal 128 of the auxiliary vehicle power distribution bus 116b. When power provided to the first power supply input 130 fails, the vehicle load 110 may use the electrical power provided to the second power supply input 130 to continue operating.

One vehicle power distribution bus 116 providing power to a vehicle load 110 after another vehicle power distribution bus 116 has failed may result in a current leak. For example, when the overload protection circuit 132 of the main vehicle power distribution bus 116 shuts off or a power line 104 connecting the main vehicle power distribution bus 116 to the power junction element 106 is disconnected, the vehicle load 110 may be provided by only the auxiliary vehicle power distribution bus 116. That is, an electrical current may flow from the auxiliary vehicle power distribution bus 116 to the second power supply input terminal 130 of the vehicle load 110. An unintended electrical current, however, may flow from the first power supply input terminal 130 of the vehicle load 110 back to the main vehicle power distribution bus 116 and output to other vehicle loads 110, including standard vehicle loads 110 that should be shut off to reduce power consumption. Additionally, such current leaks can cause circuit damage by, e.g., electrically overloading various components.

At least some of the vehicle loads 110 may also include a current leak protection circuit 140 to stop unintended current flow to a vehicle power distribution bus 116. In one example, the current leak protection circuit 140 may include one or more diodes 142 to prevent current from flowing from the vehicle load 110 to the vehicle power distribution bus 116. The anodes 144 of the diodes 142 may be connected to the power supply input terminals 130 of the vehicle load 110 and the cathodes 146 of the diodes 142 may be connected to an internal circuitry 148 of the vehicle load 110. Therefore, electrical energy may only flow from the output terminal 128 of the vehicle power distribution bus 116 to the vehicle load 110 and not in the reverse direction (i.e., from the vehicle load 110 to the vehicle power distribution bus 116). Alternatively, as another example, current leak protection circuits 140 may be incorporated into the vehicle power distribution buses 116 by, for example, placing diodes at the output terminals 128 of the vehicle power distribution buses 116 allowing only an output electrical current from the output terminal 128. Alternatively or additionally, as another example the current leak protection circuit 140 may include one or more metal-oxide-semiconductor field-effect transistors (MOSFET). MOSFETs can provide lower voltage drop in comparison to diodes, which may have a voltage drop of 0.5 to 1.0 Volt. MOSFETS may receive a control signal to turn on the supply of power to the vehicle load 110, e.g., a voltage applied to a Gate pin of the MOSFET. As one example, the vehicle load 110 may include a separate low current power supply to activate (turn on) the MOSFETs in the current leak protection circuit 140. In another example, the current leak protection circuit 140 may include two MOSFETs connected in series, i.e., a drain pin of a first MOSFET connected to a source pin of a second MOSFET.

Figure 3:
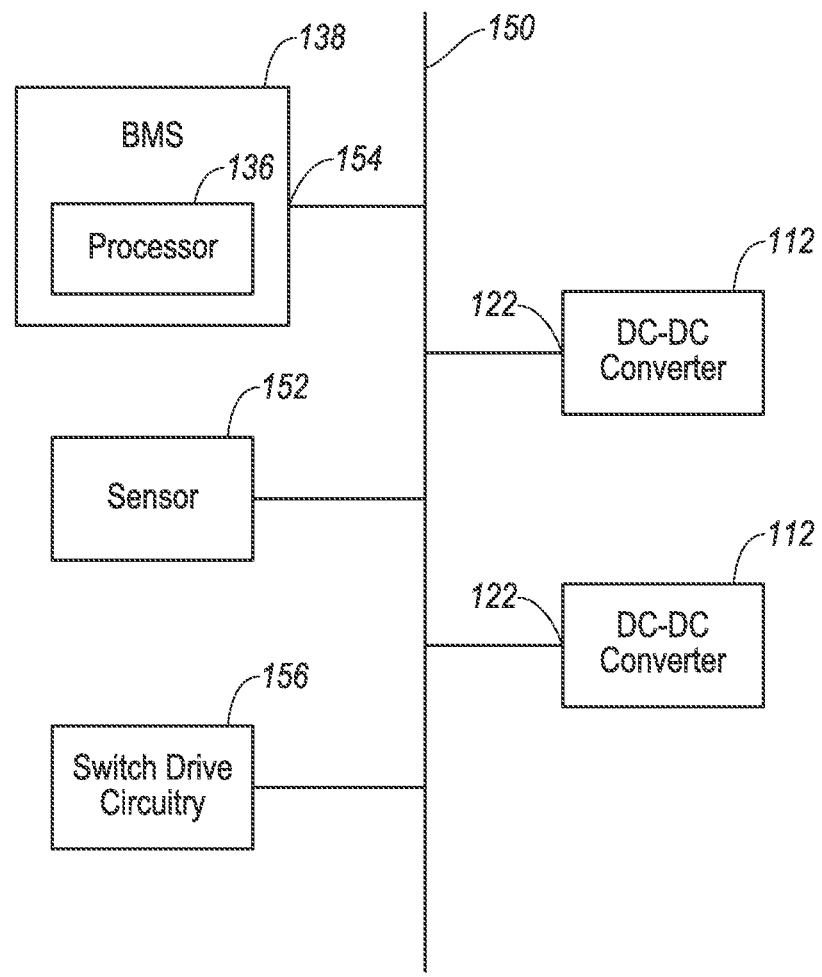
FIG. 3 illustrates a control and monitoring view of the vehicle system incorporated in the vehicle.

FIG. 3 illustrates components of the vehicle system 102 involved with certain vehicle control and monitoring operations. As shown in FIG. 3, the vehicle system 102 includes processors, electronic circuits, etc., that communicate through one or more communication buses. The communication buses 150 may be implemented as a Controller Area Network (CAN) bus, a Local Interconnect Network (LIN) bus, Serial Peripheral Interface (SPI) bus, etc.

The battery management system 138 is implemented via circuits, chips, or other electronic components that can monitor and control the operation of vehicle system 102 components such as vehicle power distribution buses 116, DC-DC converter circuits 112, vehicle batteries 114, etc. The battery management system 138 may include a processor 136 programmed to detect malfunctions associated with, e.g., the DC-DC converter circuits 112, and address the detected malfunction. For example, the battery management system 138 may be programmed to shut off standard vehicle loads 110 during a DC-DC converter circuit 112 malfunction to reduce the aggregated electrical energy consumption.

Each of the sensors 152 are implemented via circuits, chips, or other electronic components that can provide information to the battery management system 138. The sensors 152 may be current or voltage measurement sensors connected to the power lines 104 or terminal of the vehicle power generators 108, DC-DC converter circuits 112, etc. Additionally or alternatively, the sensors 152 may be implemented as diagnostic circuits included in DC-DC converter circuits 112, power distribution buses, etc. where the sensors 152 may provide signals to the battery 114 management system to report an operational status of an associated component. For example, a sensor 152 implemented as a diagnostic circuit of a DC-DC converter circuit 112 may provide information to the battery 114 management system about a loose contact or a damaged circuit inside the DC-DC converter circuit 112. Each sensor 152 may communicate diagnostic information via the communication interface 122 of the DC-DC converter circuit 112 or through a communication bus such as a Control Area Network (CAN), a Local Interconnect Network (LIN) communication bus, or Serial Peripheral Interface (SPI) bus.

Some sensors 152 may be implemented as battery monitoring sensors that provide precise current, voltage, and temperature measurements from the vehicle battery 114. Battery monitoring sensors 152 may include a shunt resistor connected to a pole of the battery 114. Electrical current supplied by the battery 114 flows through the shunt resistor. The sensor 152 measures a voltage drop across the shunt resistor to measure the current supplied by the battery 114. Battery monitoring sensors 152 may include a processor 136 and a communication interface 154, e.g., Local Interconnect Network (LIN), to communicate with a vehicle system processor, such as the processor 136 in the battery management system 138 via the communication bus 150. The processor 136 may access and execute instructions for calculating battery parameters such as temperature, health condition, etc., based at least in part on the measured current amount.

The processor 136, included in the battery management system 138 or another vehicle component, may be programmed to detect a malfunction, associated with a DC-DC converter circuit 112, select one or more individually interruptible output terminals 128 of one or more vehicle power distribution buses 116 to shut off, and shut off the one or more individually interruptible output terminals 128. When a DC-DC converter circuit 112 fails, the available amount of power for the vehicle system 102 may drop. Detecting the malfunction and shutting off one or more individually interruptible output terminals 128 may help critical vehicle loads 110 maintain operation despite the drop in available power.

The processor 136 may be programmed to determine if the malfunction is the result of a damaged part in an electronic circuit such as a chip. For instance, the processor 136 may be programmed to verify a proper operation of electronic circuit through an electronic diagnostics technique such as cyclically sending a request to a circuit under test and receiving an expected response. If the response is not received or not received as expected, the processor 136 may determine that the electronic circuit has malfunctioned. Alternatively, another processor 136, such as a processor 136 incorporated into the DC-DC converter circuit 112, may detect a malfunction associated with a part in the DC-DC converter circuit 112 and report that malfunction to the processor 136 via the communication bus. As another example, a malfunction may be caused by blown fuse or a loose power line contact. The processor 136 may be programmed to detect the loose contact by, for example, cyclically measuring a current flow through the power line 104. One way to measure the current flow is to measure the voltage drop across a shunt resistor in an electrical path. Another way to measure the current flow is to measure the voltage drop across a part of a power line 104. In this example, the processor 136 may measure the current flow based at least in part on a resistance of the part of the power line 104. A loose connection may have a larger resistance, and thus, a high current pulse may have a significant voltage drop relative to current resistance. A blown fuse or a loose power line 104 may be detected by the processor 136 if the voltage drops to zero.

If a malfunction results in reduced available electrical power, various strategies may be used to select which, if any, vehicle loads 110 to shut off. These strategies may depend on parameters like category level of the load (standard, critical, etc.) and the amount of power a load consumes. For example, vehicle loads 110 with lower category levels and higher current consumption may be turned off first. These strategies may further depend on the available electrical power and an amount of electrical energy needed to operate the critical vehicle loads 110, e.g., based on data provided by vehicle sensors 152, such as current sensors, or vehicle operation status, such as minimum speed and minimum torque required.

The processor 136 may be programmed to shut off any vehicle loads 110 selected for shut off. That is, the processor 136 may output signals to shut off the controllable switches 134 associated with the output terminals 128 providing energy to the selected vehicle loads 110. As an example, switch drive circuitry 156 may receive a shut off signal for the selected vehicle loads 110 from the processor 136 via the vehicle communication bus 150 and output a pulse to the controllable switch 134 associated with the individually interruptible output terminals 128 connected to the selected vehicle loads 110 power supply input terminals 130. To make decisions about which load to shut off, the processor 136 may rely on information stored in a processor 136 memory indicating which output terminal 128 is connected to which of the vehicle loads 110.

FIGS. 2 and 3 illustrate various example malfunction scenarios. In a first example scenario, one of the DC-DC converter circuits 112a fails. Available electrical energy from the other DC-DC converter circuit 112b may not be sufficient to operate all vehicle loads 110. Thus, the processor 136 may select at least some standard vehicle loads 110 for shutoff so that certain critical vehicle loads 110 may remain operational. In this example, the processor 136 may detect the malfunction of the DC-DC converter circuit 112a from data output by the vehicle sensors 152. For example, the processor 136 may determine the amount of current flow through the power line 104a connecting the DC-DC converter circuit 112a output terminal 120 by measuring a voltage drop across a shunt resistor placed in the power line 104a, or a voltage drop across a part of the power line 104, as discussed above. The processor 136 may select vehicle loads 110 for shutoff based at least in part on the nature of the detected malfunction. For example, the processor 136 may select the standard vehicle load 110 a for shutoff based on an estimated amount of available electrical power and the amount of electrical power needed to operate each of the vehicle loads 110. The processor 136 may selectively continue providing power to the critical vehicle load 110a connected to output terminal 128b of the main vehicle power distribution bus 116a and the standard vehicle load 110c connected to the output terminal 128c of the auxiliary vehicle power distribution bus 116. Additionally, the processor 136 may be further programmed to select the vehicle loads 110 for shut off depending on the available power of the vehicle batteries 114. The processor 136 may determine the available power from battery sensors that measure an actual battery charge and health status of the battery 114 and output such information to the processor 136. The available electrical power from the vehicle batteries 114 may compensate for some of lost electrical power of the DC-DC converter circuit 112a. In response to determining that the selected vehicle load 110(s) should shut off, the processor 136 may output a signal to the switch drive circuitry 156 to shut off the controllable switch 134 of the output terminal 128a of the main vehicle power distribution bus 116a.

In a second example scenario, the power generators 108 and one or more of the DC-DC converter circuits 112 may fail, resulting in no electrical power being output from the DC-DC converter circuits 112 to the vehicle batteries 114 and vehicle power distribution buses 116. In this instance, the processor 136 may detect the malfunction similar based on the data received from the DC-DC converter circuits 112, vehicle sensors 152, or both. The available electrical power in this example scenario may be defined as the power stored in the vehicle batteries 114. The processor 136 may receive data from battery sensors 152 indicating the battery storage status. In this example scenario, the processor 136 may shut off one or more vehicle loads 110 due to less available electrical energy. For example, the processor 136 may select to shut off the standard vehicle load 110a and the vehicle load 110c. To do so, the processor 136 may send a shut off signal to the controllable switches 134 of the output terminal 128a and the output terminal 128d.

In a third example scenario, a supply of power to the main vehicle power distribution bus 116a fails as a result of the power line 104b connecting the power junction element 106a to the input terminal 126a of the main vehicle power distribution bus 116a becoming disconnected. In this scenario, all output terminals 128 of the main vehicle power distribution bus 116 will turn off. Therefore, the critical vehicle loads 110 which have a redundant source of power, e.g., the critical load b redundantly powered by the auxiliary vehicle power distribution bus 116b via the second power supply input terminal 130b, will continue to operate. Other vehicle loads 110 with power solely supplied by the main vehicle power distribution bus 116, e.g., the vehicle load 110a, may turn off. A current leak protection circuit 140 may prevent a current leak via the first power supply input terminal 130a of the critical vehicle load 110b. As discussed previously, the current leak protection circuit 140 may include diodes 142 that prevent a current flow in an unintended direction, e.g., into the main vehicle power distribution bus 116. In one possible approach, the current leak protection circuit 140 may include one or more MOSFETS to prevent current flow in the unintended direction.

In a fourth example scenario, a supply of power to the auxiliary vehicle power distribution bus 116b fails as a result of the power line 104c connecting the power junction element 106b to the input terminal 126b of the main vehicle power distribution bus 116a becoming disconnected. In this scenario, all output terminals 128 of the auxiliary vehicle power distribution bus 116b will turn off. Therefore, the vehicle loads 110 which are supplied only via the auxiliary vehicle power distribution bus 116b will not be able to operate. Further, the vehicle loads 110 such as the critical vehicle load 110b will not be supplied via the auxiliary vehicle power distribution bus 116b, however may be operational as long as the main vehicle power distribution bus 116a is operational.

Figure 4:
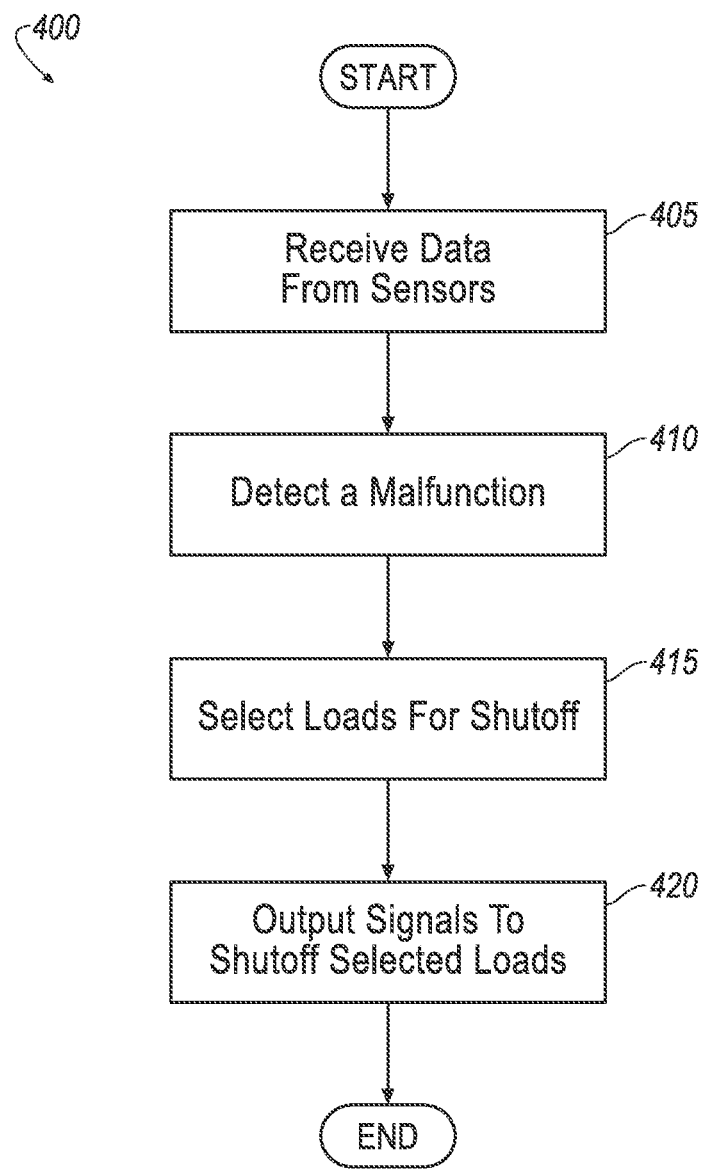
FIG. 4 is a flowchart of an example process that may be executed by a processor of the vehicle system.

FIG. 4 illustrates an example process 400 for monitoring and controlling the vehicle power distribution buses 116. The process may be initialized when the processor 136 is turned on and may continue operating until the processor 136 is turned off.

At block 405, the processor 136 receives data from vehicle sensors 152 such as shunt resistors and battery sensors 152, DC-DC converter circuits 112, and processor 136s included in the vehicle loads 110. For example, if the data represents a voltage drop across a shunt resistor, the processor 136 may determine an amount of current flow through a power line 104 based on that voltage drop. In some possible approaches, the data received at block 405 may represent diagnostic information, such as malfunction codes. The processor 136 may receive the malfunction codes from DC-DC converter circuits 112 via a vehicle communication bus. Additionally, the processor 136 may receive data from vehicle loads 110, such an electronic controller, indicating vehicle status, e.g., speed. An amount of energy needed to operate critical vehicle loads 110 may depend on the vehicle status.

At block 410, the processor 136 may detect a malfunction associated with the vehicle system 102 components. For example, the processor 136 may detect a malfunction associated with one or more of the DC-DC converter circuits 112, power junction elements 106, or power lines 104. The processor 136 may determine the malfunction in accordance with the received data. For example, a signal output by one of the DC-DC converter circuits 112 and received by the processor 136 may indicate a malfunction at the respective DC-DC converter circuit 112. Alternatively or additionally, the processor 136 may detect a malfunction based on data received from the vehicle sensors 152 measuring voltage, current flow, or both. For example, data indicating no current flow on the power line 104 a may indicate a malfunction of the DC-DC converter circuit 112a or a disconnected power line a.

At block 415, the processor 136 may select one or more vehicle loads 110 to shut off in accordance to the received data. For example, the processor 136 may determine the available amount of electrical energy in accordance to the detected malfunction. Further, the processor 136 may determine an amount of electrical energy needed to operate at least the critical vehicle loads 110 based on the vehicle status and the amount of electrical energy each critical vehicle load 110 may consume. In one possible implementation, the processor 136 may select one or more vehicle loads 110 based on the available electrical energy, the electrical energy sufficient to operate each of the vehicle loads 110, and the category (standard, critical, etc.) of each of the vehicle load 110. That is, the processor 136 may select enough standard vehicle loads 110 to shut off to ensure sufficient electrical power is available for operation of the critical vehicle loads 110.

At block 420, the processor 136 may output signals to turn off the selected vehicle loads 110. For example, the processor 136 may send signals via vehicle communication bus to the switch drive circuitry 156 specifying which output terminals 128 to be shut off. The switch drive circuitry 156 may receive the signal from the processor 136 and shut off the selected output terminals 128 of the respective vehicle power distribution buses 116 according to the received signal. Following block 420, the process 400 may end or may return to block 405 so that the processor 136 can monitor the vehicle system 102 for additional malfunctions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a plurality of DC-DC converter circuits; and
    a plurality of vehicle batteries electrically connected in parallel to each of the plurality of DC-DC converter circuits, wherein each of the vehicle batteries are electrically connected in parallel to one another,
    wherein each of the plurality of DC-DC converter circuits and each of the plurality of vehicle batteries is electrically connected to a plurality of vehicle power distribution buses.

2. The vehicle system of claim 1, wherein the plurality of vehicle power distribution buses includes:
    a main power distribution bus electrically connected to each of the plurality of DC-DC converter circuits and each of the plurality of vehicle batteries; and
    an auxiliary power distribution bus electrically connected to each of the plurality of DC-DC converter circuits and each of the plurality of vehicle batteries.

3. The vehicle system of claim 2, wherein each of the main power distribution bus and the auxiliary power distribution bus further includes an overload protection circuit that shuts off at least one of the plurality of vehicle power distribution buses when a current consumption associated with at least one of the plurality of vehicle power distribution buses exceeds a predetermined threshold.

4. The vehicle system of claim 2, wherein the main power distribution bus and the auxiliary power distribution bus each include a plurality of individually interruptible output terminals.

5. The vehicle system of claim 4, further comprising a processor programmed to detect a malfunction associated with at least one of the plurality of DC-DC converter circuits and shut off one or more of the individually interruptible output terminals of at least one of the plurality of vehicle power distribution busses in response to detecting the malfunction.

6. The vehicle system of claim 5, wherein the processor is further programmed to select one or more of the individually interruptible output terminals for shut off in accordance with a current consumption of each of loads connected to the respective individually interruptible output terminals, a safety level of the loads connected to the respective individually interruptible output terminals, and a power level of the at least one of the DC-DC converter circuits with which the detected malfunction is associated.

7. The vehicle system of claim 4, wherein each of the individually interruptible output terminals further includes an overload protection circuit that selectively interrupts at least one of the individually interruptible output terminals based at least in part on a current consumption of the individually interruptible output terminal exceeding a predetermined threshold.

8. The vehicle system of claim 4, further comprising a load having first and second power supply input terminals, wherein the first power supply input terminal is connected to one of the individually interruptible output terminals of the main power distribution bus, and wherein the second power supply input terminal is connected to at least one output of the auxiliary power distribution bus.

9. The vehicle system of claim 8, wherein the load further includes a current leak protection circuit connected to the first and the second power supply input terminals.

10. The vehicle system of claim 9, wherein the current leak protection circuit includes at least one of a plurality of transistors and a plurality of diodes, each of the plurality of diodes having an anode and a cathode, wherein each of the anodes is connected to one of the first and second power supply input terminals.

11. The vehicle system of claim 1, wherein each of the DC-DC converter circuits further includes an input terminal, wherein the input terminals of the DC-DC converter circuits are connected to one another.

12. The vehicle system of claim 11, wherein the plurality of vehicle batteries includes a first battery, a second battery, and a third battery, wherein the first and second batteries are electrically connected in parallel to each of the plurality of DC-DC converter circuits and to one another, and wherein the third battery is electrically connected to the input terminals of each of the DC-DC converter circuits.

13. A vehicle system comprising:
a plurality of DC-DC converter circuits;
a plurality of vehicle batteries electrically connected in parallel to each of the plurality of DC-DC converter circuits, wherein each of the vehicle batteries are electrically connected in parallel to one another;
a main power distribution bus electrically connected to each of the plurality of DC-DC converter circuits and each of the plurality of vehicle batteries, wherein the main power distribution bus further includes a plurality of individually interruptible output terminals;
an auxiliary power distribution bus electrically connected to each of the plurality of DC-DC converter circuits and each of the plurality of vehicle batteries, wherein the auxiliary power distribution bus further includes a plurality of individually interruptible output terminals; and
a processor programmed to detect a malfunction associated with at least one of the plurality of DC-DC converter circuits and shut off one or more of the individually interruptible output terminals of at least one of the main power distribution bus and the auxiliary power distribution bus in response to detecting the malfunction.

14. The vehicle system of claim 13, wherein the malfunction is associated with at least one of the plurality of DC-DC converter circuits.

15. The vehicle system of claim 13, wherein the malfunction is associated with at least one of the main power distribution bus and the auxiliary power distribution bus.

16. The vehicle system of claim 13, wherein each of the plurality of DC-DC converter circuits further include a diagnostics circuit, and wherein detecting a malfunction further includes receiving a signal from at least one of the diagnostic circuits.

17. The vehicle system of claim 13, further comprising a plurality of monitoring sensors, wherein detecting the malfunction further includes receiving a signal from at least one of the plurality of monitoring sensors.

18. The vehicle system of claim 17, wherein the plurality of monitoring sensors includes at least one shunt resistor.

19. The vehicle system of claim 17, wherein each of the plurality of monitoring sensors is electrically connected to an output terminal of one of the DC-DC converter circuits.

20. The vehicle system of claim 17, wherein the plurality of monitoring sensors includes a plurality of battery monitoring sensors, wherein each of the plurality of battery monitoring sensors is electrically connected to one of the plurality of vehicle batteries.

* * * * *